3,138,525
CASTOR WAX-AMPROTROPINE-RESIN COMPOSITIONS

Arnold Koff, West Orange, N.J., assignor to Hoffmann-La Roche Inc., Nutley, N.J., a corporation of New Jersey
No Drawing. Filed June 16, 1961, Ser. No. 117,505
8 Claims. (Cl. 167—55)

The present invention relates to novel compositions of matter useful as pharmaceuticals. More particularly, it relates to compositions of matter containing amprotropine.

Amprotropine, in the form of its salt with phosphoric acid (i.e. the phosphate of dl-tropic acid ester of 3-diethylamino-2,2-dimethyl-1-propanol), is a well known parasympatholytic agent, which has been employed for many years as active ingredient in prior art formulations marketed as antispasmodics; and to a limited extent, as an antispasmodic ingredient in antacid tablets. Amprotropine phosphate, the material employed commercially, is an extremely bitter-tasting substance, and this characteristic has limited the extent to which it could be incorporated in pharmaceutical formulations adapted for relatively prolonged or slow oral ingestion, e.g. by chewing, sucking, sipping or the like.

It was found previously that the use of a highly acidic cation exchange resin having at least some of the cations present as cations of amprotropine rendered the taste of amprotropine pharmaceutically acceptable. However, these resin compositions showed some tendencies to hydrolyze upon prolonged storage and exhibited less than satisfactory stability under certain conditions of temperature and humidity.

It has now been discovered that when the highly acidic cation exchange resin-amprotropine composition (hereinafter designated as amprotropine resinate) is coated with castor wax (hydrogenated castor oil) the resulting composition is tasteless, and the amprotropine is not subject to hydrolysis upon prolonged storage. Furthermore, the amprotropine is stable under many of the conditions of temperature and humidity which adversely affect the amprotropine resinate itself.

The novel compositions of the invention comprise a highly acidic cation exchange resin wherein at least some of the cations present are cations of amprotropine, i.e. cations of the formula

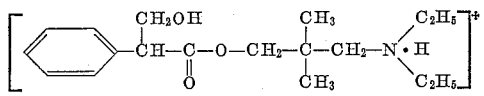

in intimate admixture with castor wax.

Suitable ion exchange resins for practicing the invention are typified particularly by highly acidic polymerized vinylbenzene-containing nuclear sulfonic acid cation exchange resins, as disclosed for example in U.S. Patent No. 2,366,007. Such resins, in a pharmaceutically acceptable, micro-powder form (i.e. of a size such that 95 percent of the material passes through a 325 mesh screen, U.S. Standard Sieve Series) are especially useful for purposes of the present invention, and are commercially available from the Rohm and Haas Co., Philadelphia, Pa., under their proprietary designation "Amberlite XE-69." However, the invention is not restricted by the source or specific characteristics of the cation exchange material employed, otherwise than as limited by the claims herein; since it will be obvious to those skilled in the art that other resins, equivalent to the "Amberlite XE-69" referred to herein, can be employed if desired.

The bulk amprotropine resinate which is employed for mixing with hydrogenated castor oil to form the novel composition of the invention can be made conveniently by charging an aqueous solution of an amprotropine salt to a desired quantity of the highly acidic cation exchange resin. It is usually convenient to employ the cation exchange resin in its alkali metal cycle; for example, "Amberlite XE-69" is supplied commercially in the sodium cycle, and is advantageously used in this form; however, if desired, the exchanger resin can be reacted when it is wholly or in part in its hydrogen cycle. Similarly, since amprotropine is conveniently available in the form of its addition salt with orthophosphoric acid, it is advantageous to employ amprotropine phosphate as a starting material in the processes of the invention; but the use of other acid addition salts, especially water-soluble mineral acid addition salts, is obviously within the purview of the invention. A satisfactory procedure for preparing the amprotropine resinate comprises agitating an aqueous solution of amprotropine phosphate with the cation exchange resin in its sodium cycle, at room temperature, until the reaction mixture has reached equilibrium. Elevated temperatures can be employed, but ordinarily there is no advantage in operating at a temperature above about 50° C., and usually it is preferred to effect the exchange reaction at room temperature, i.e. without external heating. In order to obtain a fairly high concentration of active ingredient in the amprotropine-loaded resin, it is usually desirable to continue the agitation until the concentration of amprotropine in the resin reaches at least 25 percent by weight. Ordinarily, it is preferred to allow the exchange reaction to go to equilibrium, and to reach a concentration of amprotropine in the resin of from about 34 percent to about 38 percent by weight.

After the cation exchanger has been loaded with amprotropine, the reaction mixture is filtered and the loaded resin is dried, e.g. in an oven at 45° C., or by exposure to a dry atmosphere at room temperature. Any agglomerations or lumps in the product can be broken up by grinding the dried product in a mill.

A preferred procedure for making the amprotropine resinate, in bulk form, comprises thoroughly agitating, at room temperature and for a period of several hours (e.g. from 5 to 10 hours), a desired quantity of "Amberlite XE-69" resin (micro-powder, all in sodium cycle) with an aqueous solution of amprotropine phosphate, containing about 2.0 millimoles of amprotropine phosphate per gram of resin dissolved in a quantity of water equal to about 20 times the weight of the resin. After completion of the reaction, the amprotropine resinate is separated and preferably dried in an oven at 45° C. for about three days, and ground in a mill, if necessary. The amprotropine resinate is thus obtained in the form of a fine, free-flowing, amorphous powder.

The castor wax-amprotropine resinate composition of the invention is prepared by first melting the castor wax at a temperature in the range of about 90° C. to about 140° C., preferably about 100 to about 105° C. and adding the syntropan resinate thereto with constant stirring. From about 50 to 85 weight percent, preferably 60 to 75 weight percent castor wax is employed, based on the total weight of the final castor wax-amprotropine resinate composition. The resulting suspension of amprotropine resinate in the melted castor wax is spray-chilled into an atmosphere which can be air, or an inert atmosphere, e.g. a nitrogen atmosphere or rare gas atmosphere. The spray chilling can be carried out in conventional equipment using atomizing spray nozzles such as a high speed centrifugal atomizing wheel, a centrifugal atomizing nozzle, or a 2-fluid spray nozzle. The beadlets resulting from the spray chilling step exist in the form of a fine, free-flowing, amorphous, tasteless, highly stable powder having a substantially spheroid shape with a particle size in the range of about 30 to about 600 microns and preferably within the range of about 40 to about 250 microns.

The castor wax-amprotropine resinate powder can be incorporated in liquid or solid pharmaceutical dosage forms, by methods known per se; and such pharmaceutical formulations, based on the amprotropine-loaded resins, constitute ancillary aspects of the present invention. Such dosage forms, containing amprotropine-resin powders as described above as an active ingredient, are particularly adapted for slow oral ingestion, as by chewing, sucking or sipping. The castor wax-amprotropine resinate powder used for the latter purpose should not have a particle size over about 250 microns since a "gritty" effect would be obtained in the mouth, rendering the compositions less palatable. Accordingly, for these uses the preferred range of particle size is important and is not equivalent to the broad range given above.

The invention is further disclosed in the following examples which are given for illustration purposes only and are not meant to limit the invention.

*Example 1*

Dissolve 810 g. of amprotropine phosphate in 20 liters of deionized water. To the solution add 1 kg. of "Amberlite XE–69" resin, pharmaceutical grade, micro form (finer than 325 mesh), sodium cycle. Stir the suspension well for 6 hours at 25° C. Filter the mixture through a centrifugal filter (whiz-bag type). Wash the cake with 5 liters of deionized water. Dry the washed cake in an oven at 45° C. for 72 hours. Pass the dry resin through a Fitzpatrick mill to break up lumps formed during drying.

Add 1 kg. of the dry amprotropine resinate to 2 kg. of melted castor wax maintained at a temperature of 100–105° C. Stir the mixture thoroughly and spray-chill the resulting suspension using a high speed centrifugal atomizing wheel. The product is a fine, amorphous, highly stable, tasteless powder.

*Example 2*

To 50 g. of amprotropine phosphate dissolved in 250 cc. of water, add 30 cc. of 25 percent aqueous sodium hydroxide solution and 300 cc. of chloroform. Extract amprotropine base into the chloroform layer by shaking for 15 minutes. Remove the chloroform layer, and extract the base therefrom by shaking the chloroform layer with 300 cc. of deionized water containing HCl equivalent to the amprotropine base plus 5 percent excess. Discard the chloroform layer. Filter the aqueous layer, adjust pH to 4.5 (approximately the pH of amprotropine hydrochloride) by adding NaOH solution, and add deionized water to make up the total volume to 1500 cc. This solution contains 37.9 g. of amprotropine base, in the form of its hydrochloride.

Add 60 g. of "Amberlite XE–69" resin (pharmaceutical grade, micro form, all in sodium cycle) to the above 1500 cc. of amprotropine hydrochloride solution. Stir well for one hour. Filter off the amprotropine-loaded resin, and wash with one liter of water. Dry at 45° C. for 72 hours, and mill. The resin is similar to that obtained in Example 1, but contains 29.6 percent by weight of amprotropine.

Add 100 g. of the dry amprotropine resinate to 196 g. of melted castor wax maintained at a temperature of 100–105° C. Stir the mixture thoroughly and spray-chill using a centrifugal atomizing nozzle. The resulting product is similar to that of Example 1, but contains 10 percent by weight of amprotropine.

*Example 3*

Agitate 100 g. of "Amberlite XE–69" resin, of the same type employed in Examples 1 and 2, with 1000 cc. of 0.05 N aqueous HCl. Filter off the resin, wash with 500 cc. of deionized water, and dry at 45° C. for 72 hours. This processing puts a portion of the resin in the hydrogen cycle.

To a solution of 50 g. of amprotropine phosphate in 250 cc. of water, add 25 cc. of 25 percent NaOH and 300 cc. of chloroform. Shake the mixture in a separatory funnel for 15 minutes and remove the chloroform layer containing amprotropine base. Wash the chloroform layer with water or slightly acidified water until the wash water pH is 8.0 or lower. Fifty cc. of chloroform solution contains 6.3 g. of amprotropine base.

Stir 10 g. of the above-processed "Amberlite XE–69" resin (partially converted to the hydrogen cycle) with 50 cc. of the above described chloroform solution of amprotropine, for 30 minutes. Filter off the amprotropine-loaded resin, and wash with chloroform. Dry the washed resin at 45° C. for 24 hours. The amprotropine resin is similar ot that of Example 1, but contains 34.9 percent by weight of amprotropine.

Add 15 g. of the dry amprotropine resinate to 28 g. of melted castor wax maintained at a temperature of 100–105° C. Stir the mixture thoroughly and spray-chill using a 2-fluid spray nozzle. The resulting product is similar to that of Example 1, but contains 10 percent by weight of amprotropine.

*Example 4*

Agitate 120 g. of "Amberlite XE–69" resin, same kind as used in Example 1, with a solution of 100 g. of amprotropine phosphate in 3 liters of water, for 1 hour at 25° C. Filter off the amprotropine-containing resin, and wash with 1 liter of water. Dry the washed resin at 45° C. for 72 hours. The resin is similar to that of Example 1, but contains 25.9 percent by weight of amprotropine.

Add 200 g. of the dry amprotropine resinate to 214 g. of melted castor wax maintained at a temperature of 100–105° C. Stir the mixture thoroughly and spray-chill using a 2-fluid spray nozzle. The resulting product is similar to that of Example 1, except that it contains 12.5 percent by weight of amprotropine.

*Example 5*

Exactly similar to Example 4, except that the amprotropine-resin suspension is stirred for 1 hour at 45° C., and the resin contains 25.6 percent by weight of amprotropine, and the final product contains 7.5 percent by weight of amprotropine.

*Example 6*

Granulate a mixture of 180 g. of aluminum hydroxide; 320 g. of magnesium trisilicate; 30 g. of corn starch; 200 g. of mannitol; and 65 g. of sucrose with a 40 percent sucrose solution. After drying at 45° C. for 48 hours and grinding through a No. 16 mesh screen, add 38 g. of castor wax-amprotropine-"Amberlite XE–69" resin containing 10 percent by weight of amprotropine (that described in Example 1); 10 g. of magnesium stearate; and 10 g. of powdered peppermint flavor. Mix well and compress into one thousand tablets, for use as an antacid.

*Example 7*

Exactly similar to Example 6, except that 76 g. of the same castor wax-amprotropine-containing resin is used as the antispasmodic ingredient.

*Example 8*

Exactly similar to Example 6, except that 10 g. of phenindamine tartrate is added to the granulation as an anti-allergenic ingredient.

*Example 9*

Granulate a mixture of 500 g. of dihydroxy aluminum aminoacetate; 30 g. of corn starch; 200 g. of mannitol; 3.7 g. of sodium "Sucaryl"; and 65 g. of sucrose with a 40% solution of sucrose. After drying at 45° C. for 48 hours and grinding through a No. 16 screen, add 76 g. of castor wax-amprotropine-"Amberlite XE–69" resin containing 10 percent by weight of amprotropine (that described in Example 1); 10 g. of magnesium stearate; and 10 g. of powdered peppermint flavor. Mix well and compress into one thousand tablets, for use as an antacid.

Example 10

Exactly similar to Example 9, except that 15 g. of phenobarbitol is added to the granulation, as a sedative ingredient; and 38 g. of the same castor wax-amprotropine-containing resin is used as the antispasmodic ingredient.

Example 11

Granulate a mixture of 200 g. of mannitol; and 200 g. of 4X sucrose with 15% corn starch paste. After drying at 45° C. for 48 hours and grinding through a No. 16 mesh screen, add 114 g. of castor wax-amprotropine-"Amberlite XE–69" resin containing 10 percent by weight of amprotropine (that described in Example 1); and 5 g. of magnesium stearate. Mix well and compress into one thousand tablets, for use as an antispasmodic.

Example 12

Exactly similar to Example 11, except that 15 g. of phenobarbitol is added to the granulation, as a sedative ingredient.

Example 13

Granulate a mixture of 224 g. of acetylsalicylic acid; 160 g. of acetophenetidin; 30 g. of caffeine; and 100 g. of 4X sucrose with 15% corn starch paste. After drying at 45° C. for 48 hours and grinding through a No. 16 mesh screen, add 76 g. of castor wax-amprotropine-"Amberlite XE–69" resin containing 10 percent by weight of amprotropine (described in Example 1); 10 g. of talc; and 10 gm. of "Sterotex" lubricant. Mix well and compress into one thousand tablets, for use as an analgesic.

Example 14

Exactly similar to Example 13, except that 10 g. of phenindamine tartrate is added to the granulation, as an anti-allergenic ingredient.

Example 15

Exactly similar to Example 13, except that 10 g. of phenindamine tartrate, an anti-allergenic, and 5 g. of phenylephrine hydrochloride, a decongestant, are added to the granulation, to prepare one thousand analgesic or cold tablets.

Example 16

Granulate a mixture of 150 g. of dihydroxy aluminum aminoacetate; 3 g. of sodium "Sucaryl" and 30 g. of corn starch with a solution of 40% sucrose, and dry at 45° C. for 48 hours. Granulate 320 g. of acetylsalicyclic acid with 15% corn starch paste and dry at 45° C. for 48 hours. After grinding both granulates through a No. 16 mesh screen, blend them together and add 38 g. of castor wax-amprotropine-"Amberlite XE–69" resin containing 10 percent by weight of amprotropine (described in Example 1); 10 g. of talc and 10 g. of "Sterotex" lubricant. Mix well and compress into one thousand buffered analgesic tablets.

Example 17

Granulate a mixture of 250 g. of acetophenetidin; 150 g. of isopropyl-antipyrine; 50 g. of caffeine; 5 g. of sodium "Sucaryl"; 30 g. of corn starch; and 40 g. of 4X sucrose with a 30% ethanol solution of "Carbowax" 6000, and dry at 45° C. for 48 hours. Granulate a mixture of 30 g. of methyprylon; 50 g. of calcium silicate; and 10 g. of corn starch with a 5% solution of methylcellulose (100 cps.), and dry at 45° C. for 48 hours. After grinding both granulates through a No. 16 mesh screen, blend them together and add 76 g. of castor wax-amprotropine-"Amberlite XE–69" resin containing 10 percent by weight of amprotropine (described in Example 1); 10 g. of talc and 10 g. of magnesium stearate. Mix well and compress into one thousand tablets, for use as an analgesic.

Variations in the process and product of the invention can be undertaken by those skilled in the art without departing from the scope of the invention.

I claim:

1. As a composition of matter, a highly acidic cation exchange resin wherein at least some of the cations present are cations of amprotropine, coated with castor wax.

2. As a composition of matter, a pharmaceutically acceptable nuclear sulfonic acid cation exchange resin wherein at least a substantial proportion of the cations present are cations of amprotropine, coated with castor wax.

3. As a composition of matter, a pharmaceutically acceptable, micropowder, castor wax coated highly acidic polymerized vinyl-benzene-containing nuclear sulfonic acid cation exchange resin containing amprotropine cations to an extent of at least about 25 percent amprotropine by weight of said composition.

4. A pharmaceutical composition of matter adapted for slow oral ingestion comprising pharmaceutical adjuvant material in admixture with the composition of claim 3.

5. As a composition of matter, a pharmaceutically acceptable, micro-powder, said micro-powder comprising castor wax coated on from about 15 to about 50 percent by weight, based on the weight of said composition, of a highly acidic polymerized vinyl-benzene-containing nuclear sulfonic acid cation exchange resin containing amprotropin cations to an extent of from about 25 percent to about 38 percent amprotropine by weight of said resin.

6. A composition according to claim 5 wherein said resin is present in an amount ranging from about 25 to about 40 percent by weight.

7. An antacid composition containing acid-neturalizing ingredients in admixture with the composition of claim 5.

8. An analgesic composition containing analgesic ingredients in admixture with the composition of claim 5.

References Cited in the file of this patent

UNITED STATES PATENTS

| | | |
|---|---|---|
| 2,805,977 | Robinson | Sept. 10, 1957 |
| 2,990,332 | Keating | June 27, 1961 |

OTHER REFERENCES

Amer. Drug Index, 1960, J. B. Lippincott, Phila., p. 51.